UNITED STATES PATENT OFFICE.

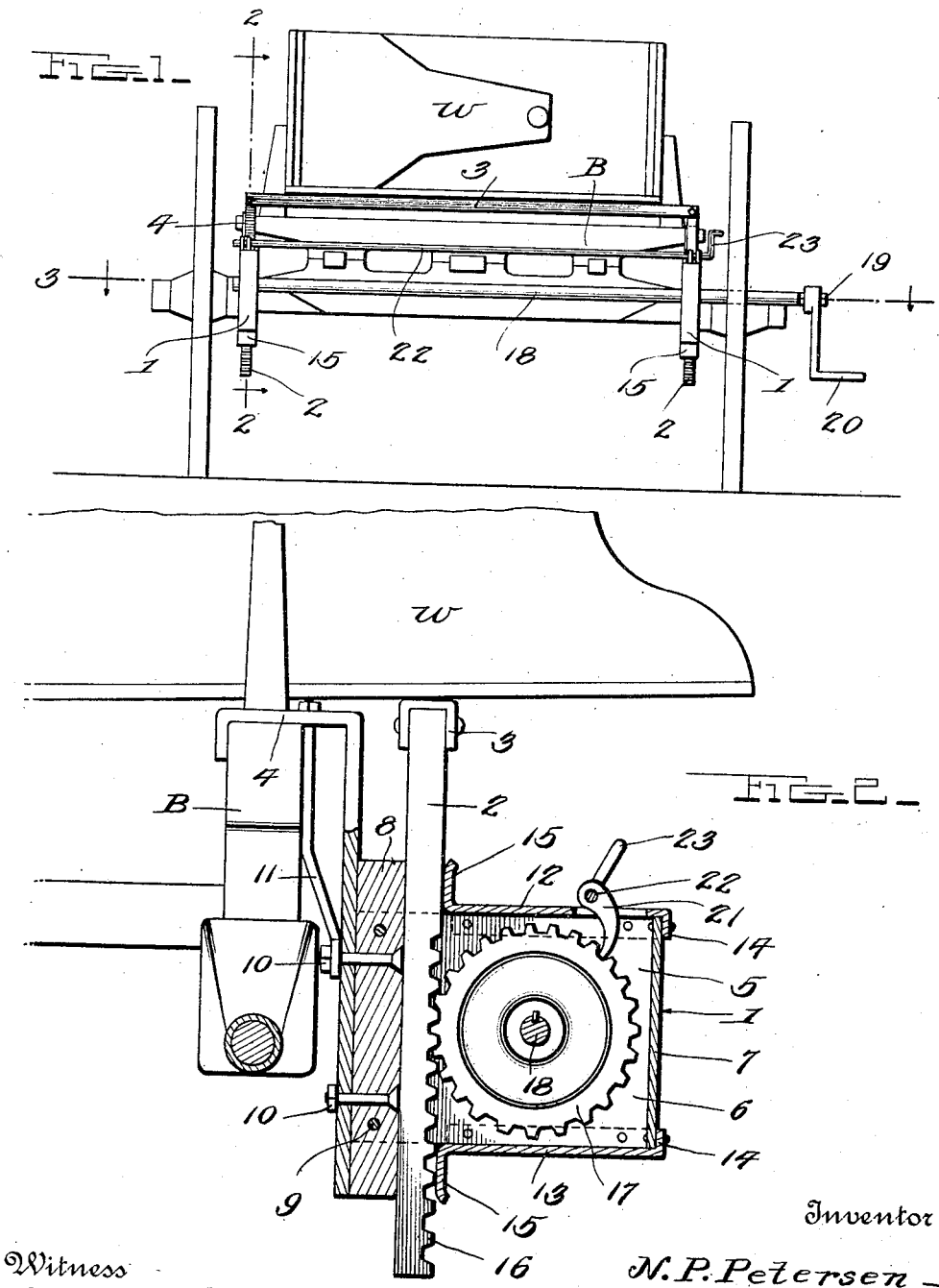

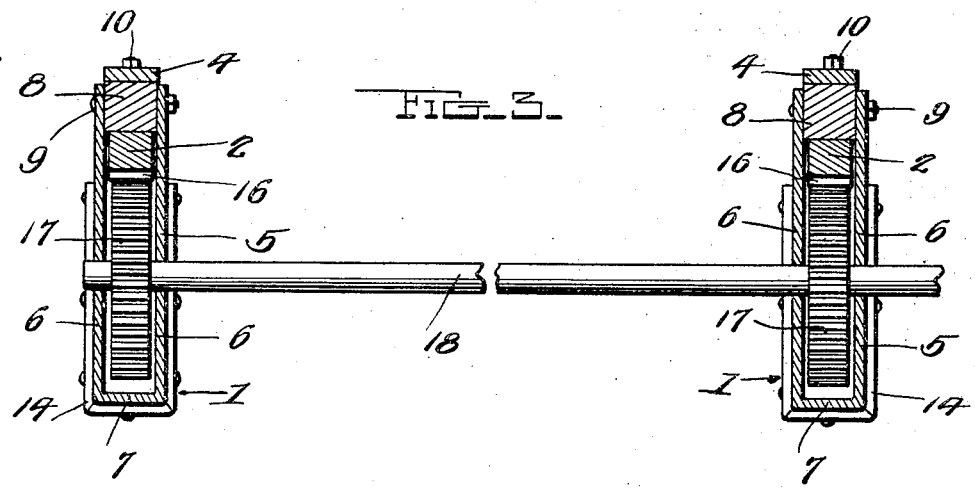
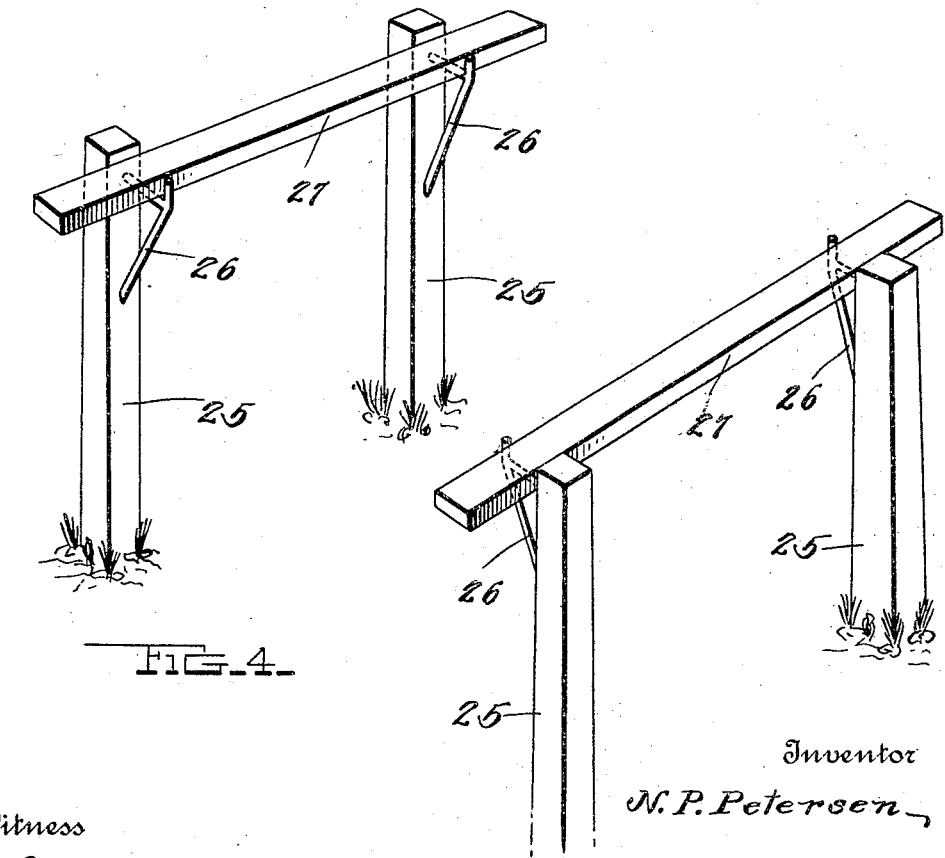

NELS P. PETERSEN, OF VERDI, MINNESOTA.

HAY-RACK AND WAGON-BOX JACK.

1,238,329.  Specification of Letters Patent.  Patented Aug. 28, 1917.

Application filed January 30, 1917. Serial No. 145,498.

*To all whom it may concern:*

Be it known that I, NELS P. PETERSEN, a citizen of the United States, residing at Verdi, in the county of Lincoln and State of Minnesota, have invented certain new and useful Improvements in Hay-Rack and Wagon-Box Jacks; and I do declare the following to be a full, clear, and exact description of the invention, such as will enable others skilled in the art to which it appertains to make and use the same.

My invention has for its object to provide a simply constructed and inexpensive, yet highly efficient jack for raising and lowering hay racks and wagon boxes respectively from and onto the running gears thereof and with this general object in view the invention resides in certain novel features of construction and unique combinations of parts to be hereinafter fully described and claimed, the descriptive matter being supplemented by the accompanying drawings which constitute a part of this application and in which:

Figure 1 is an end elevation of a wagon showing the improved jack in use;

Fig. 2 is a vertical section on the plane of the line 2—2 of Fig. 1;

Fig. 3 is a horizontal section on the plane of the line 3—3 of Fig. 1;

Fig. 4 is a perspective view of the rack employed for supporting the wagon box or hay rack when the latter is not in use.

In the drawing above briefly described the numeral 1 designates broadly a pair of supports upon each of which is carried a vertical jack shank 2 and means for operating it, the upper ends of said shanks being connected by a horizontal bar 3 adapted to support thereon the wagon box W when the latter is raised from the running gear. Each support 1 is provided with a hook 4 to engage the ends of the wagon bolsters B to sustain said supports while the jack is in operation.

Each support 1 is in the form of a flat casing preferably constructed as shown in the drawings, this construction consisting in bending an elongated rectangular plate 5 substantially upon itself along its vertical center to form the two sides 6 of the casing and one end 7 thereof, a vertically disposed bar 8 of wood or any other suitable material being interposed between the free ends of said sides 6 and secured in place by bolts or the like 9 to form the other end of the casing. It is to the bars 8 that the vertical shanks of the hooks 4 are secured by bolts 10, the angles between the shanks and the bills of the hooks being preferably reinforced by braces 11 having one end secured in place by the uppermost of said bolts 10.

The top 12 and bottom 13 of each of the casings are formed of separate metal plates preferably having their edges bent laterally to form flanges 14 riveted or otherwise secured in contact with the outer faces of the sides 6 and end 7. One end of each plate 12—13 terminates at a point spaced inwardly from the inner face of the adjacent bar 8 to form openings through which the jack shanks 2 slide, this end of said plates being by preference bent outwardly at right angles to form shoes 15 to guide said shanks 2. As is shown most clearly in Fig. 2, the edge of the bars 2 engaged by the shoes 15 are formed with rack teeth 16, while the opposite edge of said shanks contact slidably with the bars 8 and the countersunk heads of the bolts 10.

Mounted within the supports or casings 1 are spur gears 17 whose teeth mesh with the teeth 16, said gears being keyed on a common shaft 18 having a squared end 19 for the reception of a crank 20 by means of which the gears are rotated to raise and lower the shanks 2. To hold the parts against retrograde movement, dogs 21 are mounted on a rock shaft 22 for engagement with the teeth of the gears 17, said rock shaft being mounted in suitable bearings carried by the casings 1 and being provided with a crank 23 by means of which it is turned to release or apply the dogs as occasion may demand.

In operation, the hooks 4 are hooked over the ends of one of the bolsters B with the bar 3 then disposed beneath the hay rack or wagon box W. The shaft 18 is now rotated by means of the crank 20 so that the gears 17 cause the jack shanks 2 to rise, thus lifting the box clear of the running gear. This end of the box may now be supported in any suitable manner while the other end is raised in the same way after which the runner gear will be pulled from under the box, or rack.

Preferably employed for supporting the box or rack when removed from the running gear, is a rack shown in Fig. 4. The rack in question consists of four suitably spaced posts 25, brackets 26 carried by the upper ends thereof and horizontal bars 27 to rest on said brackets for supporting the box W. The wagon is run in between the post 25 and one end of the box or hay rack is raised as above described. One of the bars 27 is then inserted beneath the raised end with its ends supported by the brackets 26. This having been done the jack is removed from this end of the body and transferred to the other, the latter being now raised and then supported by the other bar 27.

From the foregoing taken in connection with the accompanying drawings, it will be obvious that although the invention is of extremely simple and inexpensive nature it will be highly efficient and durable. For these reasons the construction shown constitutes the preferred form of the improved jack but it is to be understood that within the scope of the invention as claimed numerous changes may be made without sacrificing the principal advantages.

I claim:

1. A wagon box and hay rack jack comprising a pair of casings spaced horizontally and means for supporting them, a horizontal shaft extending between and through said casings and means for rotating said shaft, spur gears on said shaft and positioned in said casings, jack shanks slidable vertically through said casings and having rack teeth in mesh with said gears, a horizontal rod extending between said casings and means for rocking said rod, and a pair of dogs secured on said rod and positioned in said casings in engagement with said gears to hold them against retrograde movement.

2. A jack comprising a flat vertically disposed casing and means for supporting the same, said casing having at one end a vertical bar, the top and bottom of said casing being bent respectively upwardly and downwardly adjacent said bar to form a pair of openings and a pair of vertically disposed shoes at one end thereof, a vertical jack shank received slidably in said openings and positioned in sliding contact with said bar and shoes, and means in said casing for operating said shank.

In testimony whereof I have hereunto set my hand in the presence of two subscribing witnesses.

NELS P. PETERSEN.

Witnesses:
 WARREN MILLER,
 GROVER BOVING.